United States Patent
Takemoto (10) Patent No.: US 11,346,521 B2
(45) Date of Patent: May 31, 2022

(54) LIGHT PROJECTION DEVICE AND LIGHT PROJECTION DEVICE FOR VEHICLE

(71) Applicant: FUNAI ELECTRIC CO., LTD., Osaka (JP)

(72) Inventor: Seiji Takemoto, Osaka (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 0 days.

(21) Appl. No.: 17/243,586

(22) Filed: Apr. 29, 2021

(65) Prior Publication Data

US 2021/0341126 A1 Nov. 4, 2021

(30) Foreign Application Priority Data

Apr. 30, 2020 (JP) .............................. JP2020-080019

(51) Int. Cl.
*F21S 41/675* (2018.01)
*F21S 41/25* (2018.01)
*F21W 102/20* (2018.01)
*F21W 107/10* (2018.01)

(52) U.S. Cl.
CPC ............. *F21S 41/675* (2018.01); *F21S 41/25* (2018.01); *F21W 2102/20* (2018.01); *F21W 2107/10* (2018.01)

(58) Field of Classification Search
None
See application file for complete search history.

(56) References Cited

U.S. PATENT DOCUMENTS

| 6,191,802 B1 * | 2/2001 | Kessler | B41M 3/06 347/225 |
| 9,835,774 B2 | 12/2017 | Yamaguchi et al. | |
| 10,288,242 B2 | 5/2019 | Reisinger et al. | |
| 2010/0020291 A1 * | 1/2010 | Kasazumi | G02B 26/0808 353/38 |
| 2015/0369437 A1 * | 12/2015 | Reinprecht | F21S 41/143 362/510 |
| 2020/0072433 A1 | 3/2020 | Scoville | |

FOREIGN PATENT DOCUMENTS

| DE | 112014003428 | 4/2016 |
| DE | 102018209302 | 12/2019 |
| JP | 2014089990 | 5/2014 |
| WO | 2017020054 | 2/2017 |
| WO | 2020065391 | 4/2020 |

\* cited by examiner

*Primary Examiner* — Elmito Breval
(74) *Attorney, Agent, or Firm* — JCIPRNET (57) ABSTRACT

Provided is a light projection device and a light projection device for vehicle, and the light projection device includes: a light source having light emission portions disposed side by side in a predetermined direction; convex lenses, which focus light irradiated from the light emission portions; an optical scanner having a mirror portion that scans the light passing through the convex lenses, and a drive source swinging the mirror portion; and a projection lens disposed between the convex lenses and the mirror portion, or disposed in a position to which the light scanned from the mirror portion is projected. The convex lenses are disposed side by side in the predetermined direction at intervals so that the light transmitted through and focused by the convex lenses in a stationary state comes close.

13 Claims, 9 Drawing Sheets

LIGHT PROJECTION DEVICE AND LIGHT PROJECTION DEVICE FOR VEHICLE

CROSS REFERENCE TO RELATED APPLICATIONS

This application claims the priority benefit of Japanese Patent Application No. 2020-080019, filed on Apr. 30, 2020. The entirety of the above-mentioned patent application is hereby incorporated by reference herein and made a part of this specification.

BACKGROUND

Technical Field

The disclosure relates to a light projection device and a light projection device for vehicle, and particularly relates to a light projection device and a light projection device for vehicle including a light source having a plurality of light emission portions.

Related Art

Conventionally, a light projection device and a light projection device for vehicle including a light source having a plurality of light emission portions are known (for example, see Patent literature 1, Japanese Patent Application Laid-Open No. 2014-89990).

Patent literature 1 described above includes a light source including a light emission element, a mirror which reflects light emitted by the light source, and an actuator for operation which reciprocally rotates the mirror and scans an illumination region by the reflected light of the mirror.

When a plurality of light emission portions is included as disclosed in Patent literature 1 described above, if an interval between the plurality of light emission portions is wide, in the intensity distribution of the irradiation light, a large trough portion in which light intensity is low is formed between peaks of light intensity of each of the light emission portions which is irradiated on a mirror portion. Therefore, there is a problem that when the mirror portion is reciprocally rotated and the illumination region is scanned by the reflected light of the mirror portion, local light intensity variation is generated.

SUMMARY

The disclosure is to provide a light projection device and a light projection device for vehicle which can suppress the generation of local light intensity variation when the mirror portion is scanned.

A light projection device according to a first aspect of the disclosure includes: a light source which has a plurality of light emission portions disposed side by side in a predetermined direction; a plurality of convex lenses arranged in the same number as the plurality of light emission portions, which focus light when the light is irradiated from the plurality of light emission portions; an optical scanner which has a mirror portion that scans the light passing through the plurality of convex lenses in the direction in which the plurality of light emission portions are arranged, and a drive source that swings the mirror portion; and a projection lens which is disposed between the plurality of convex lenses and the mirror portion, or disposed so as to allow the light to be transmitted through after the light is scanned from the mirror portion. The plurality of convex lenses is disposed side by side in the predetermined direction at intervals so that the light which is transmitted through and focused by the plurality of convex lenses in a stationary state comes close. Here, "coming close" includes a case in which the light is close to each other but does not intersect, in addition to a case in which one end of the irradiation range of the focused light intersects.

A light projection device for vehicle according to a second aspect of the disclosure is mounted on a vehicle and irradiates light ahead of the vehicle, and includes: a light source which has a plurality of light emission portions disposed side by side in a predetermined direction; a plurality of convex lenses arranged in the same number as the plurality of light emission portions, which focus the light when the light is irradiated from the plurality of light emission portions; an optical scanner which has a mirror portion that scans the light passing through the plurality of convex lenses in the direction in which the plurality of light emission portions are arranged, and a drive source that swings the mirror portion; and a projection lens which is disposed between the plurality of convex lenses and the mirror portion, or disposed in a position to which the light scanned from the mirror portion is projected. The plurality of convex lenses is disposed side by side in the predetermined direction at intervals so that the light which is transmitted through and focused by the plurality of convex lenses in a stationary state comes close.

DESCRIPTION OF THE EMBODIMENTS

Hereinafter, embodiments of the disclosure are described based on the drawings.

First Embodiment

Configuration of Electronic Mirror for Vehicle

With reference to FIG. 1 to FIG. 13, the configuration of a light projection device 100 according to a first embodiment of the disclosure is described.

Moving Body

Figure 1:
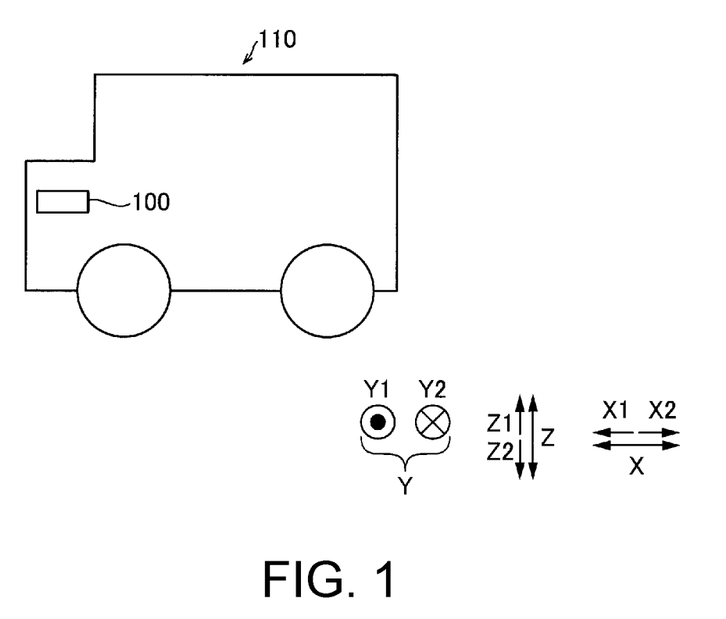
FIG. 1 is a diagram showing a vehicle on which a light projection device is arranged.

As shown in FIG. 1, the light projection device 100 according to the embodiment is mounted on a vehicle 110. In addition, the light projection device 100 is configured to irradiate light ahead of the vehicle 110. Besides, in the specification, an up-down direction is set as a Z direction, an upward direction is set as a Z1 direction, and a downward direction is set as a Z2 direction. In addition, two directions perpendicular to each other in a plane perpendicular to the Z direction are respectively set as a X direction and a Y direction. One side of the X direction is set as a X1 direction, and the other side of the X direction is set as a X2 direction. In addition, one side of the Y direction is set as a Y1 direction, and the other side of the Y direction is set as a Y2 direction. In an example shown in FIG. 1, the front of the vehicle 110 is the X1 direction.

Configuration of Light Projection Device

Figure 2:
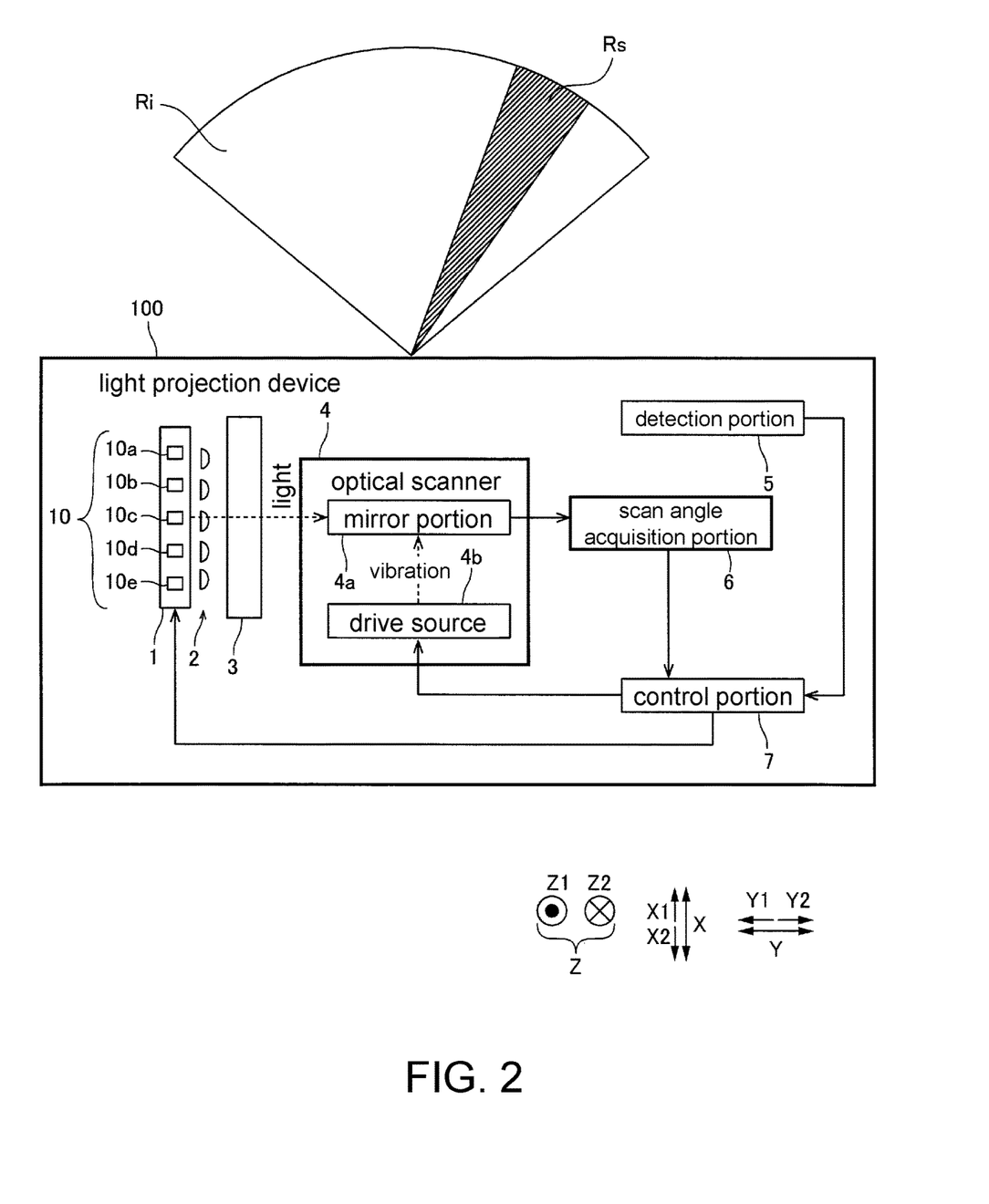
FIG. 2 is a diagram showing the configuration of the light projection device.

As shown in FIG. 2, the light projection device 100 according to the embodiment includes a light source 1, convex lenses 2, a projection lens 3, an optical scanner 4, a detection portion 5, a scan angle acquisition portion 6, and a control portion 7. The light projection device 100 is configured to irradiate light toward an advance direction of the vehicle 110 (the X1 direction).

The light source 1 is configured to output light. Specifically, the light source 1 has a plurality of light emission portions 10 disposed side by side in a predetermined direction. Besides, in the first embodiment, the plurality of light emission portions 10 are disposed side by side along the X direction. In the embodiment, the plurality of light emission portions 10 include a first light emission portion 10a, a second light emission portion 10b, a third light emission portion 10c, a fourth light emission portion 10d, and a fifth light emission portion 10e. The light irradiated from the plurality of light emission portions 10 is irradiated to a mirror portion 4a included in the optical scanner 4 via the convex lenses 2 and the projection lens 3. The light source 1 includes, for example, a Light Emitting Diode (LED), a Laser Diode (LD), or the like. In the embodiment, the light source 1 includes a LED.

The convex lenses 2 are configured to focus the light irradiated from the light source 1. The convex lenses 2 are arranged in the same number as the plurality of light emission portions 10. The convex lenses 2 are, for example, magnifying lenses or focusing lenses.

The light which is transmitted through and focused by the convex lenses 2 is irradiated to the projection lens 3. The projection lens 3 is configured to further focus, to the mirror portion 4a included in the optical scanner 4, the light which is transmitted through and focused by the convex lenses 2. The projection lens 3 is disposed between the plurality of convex lenses and the mirror portion.

The optical scanner 4 includes the mirror portion 4a and a drive source 4b. The optical scanner 4 is configured to swing the mirror portion 4a by a plate wave generated by the drive source 4b and scan the light irradiated from the plurality of light emission portions 10.

The mirror portion 4a is configured to scan the light transmitted through the projection lens 3 in the direction in which the plurality of light emission portions 10 are arranged.

The drive source 4b is configured to swing the mirror portion 4a. The drive source 4b includes, for example, a piezoelectric element. The piezoelectric element is formed by, for example, lead zirconate titanate (PZT). The details of the configuration by which the drive source 4b swings the mirror portion 4a are described later.

The detection portion 5 is configured to detect, in a region Ri in which the light scanned by the mirror portion 4a is irradiated, a region Rs in which the light is extinguished. The detection portion 5 includes, for example, an optical imaging device (an imaging camera), or a laser sensor, an ultrasonic sensor, or the like.

Figure 4:
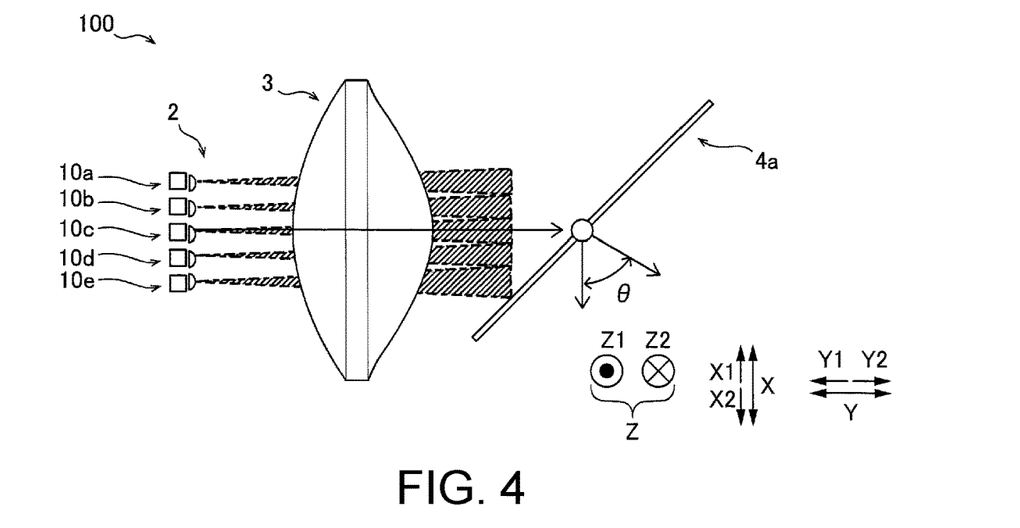
FIG. 4 is a diagram showing a positional relationship among light emission portions, convex lenses, a mirror portion, and a projection lens according to a first embodiment.

The scan angle acquisition portion 6 is configured to acquire a scan angle θ of the mirror portion 4a (see FIG. 4). The scan angle acquisition portion 6 includes, for example, a magnetic angle sensor.

The control portion 7 is configured to control each portion of the light projection device 100. In addition, the control portion 7 is configured to control the irradiation of the light performed by the light source. In addition, the control portion 7 is configured to control the optical scanner 4. The control portion 7 is configured to form the region Ri in which the light is irradiated and the region Rs in which the light is shielded. The control portion 7 includes, for example, a processor such as a central processing unit (CPU) or the like.

(Configuration of Light Projection Device)

Figure 3:
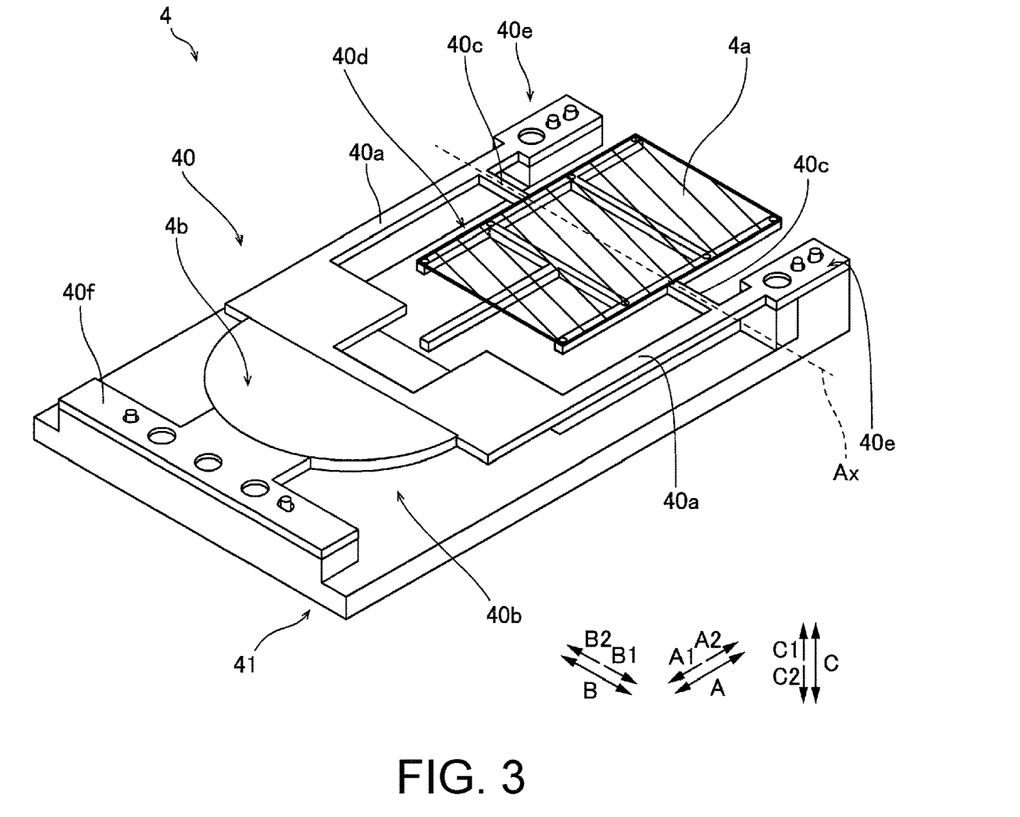
FIG. 3 is a diagram showing the configuration of an optical scanner.

As shown in FIG. 3, the light projection device 100 includes the mirror portion 4a, the drive source 4b, a substrate 40, and a holding member 41. Besides, in the example shown in FIG. 3, a direction perpendicular to a swing axis Ax of the substrate 40 is set as an A direction, one side thereof is set as an A1 direction, and the other side thereof is set as an A2 direction. In addition, a direction in which the swing axis Ax extends is set as a B direction, one side thereof is set as a B1 direction, and the other side thereof is set as a B2 direction. In addition, a direction perpendicular to an AB plane is set as a C direction, one side thereof is set as a C1 direction, and the other side thereof is set as a C2 direction.

The mirror portion 4a is configured to reflect the light irradiated from the light source 1. The mirror portion 4a is configured by a metal member having a flat plate shape. The mirror portion 4a is configured by, for example, aluminium. In the embodiment, the mirror portion 4a is arranged separately from the substrate 40. Specifically, the mirror portion 4a is arranged on a mirror portion disposition portion 40d. Besides, in the example shown in FIG. 3, the mirror portion 4a is shown with hatching for convenience.

The substrate 40 includes a pair of beam portions 40a, a support portion 40b, and torsion portions 40c. In addition, the substrate 40 includes the mirror portion disposition portion 40d on which the mirror portion 4a is disposed. The substrate 40 is configured by, for example, a stainless-steel material having a flat plate shape.

Each of the pair of beam portions 40a is supported by the support portion 40b on an A1 direction side. In addition, in the example shown in FIG. 3, by increasing widths in the B direction of end portions on a A2 direction side of the pair of beam portions 40a, holding portions 40e are formed. In addition, the holding portions 40e is held by the holding member 41 in a way of, for example, being screw-attached.

The support portion 40b is configured to support an end portion on the A1 direction side of each of the pair of beam portions 40a. In addition, on the support portion 40b, the drive source 4b is arranged. In addition, the support portion 40b has, in the A1 direction, a holding portion 40f on an end portion on a side on which the pair of beam portions 40a are not supported. The support portion 40b is held by the holding member 41 in a way of, for example, being screw-attached.

The torsion portion 40c is supported so as to be capable of swinging the mirror portion 4a around the swing axis Ax. The torsion portion 40c extends in a direction (the B direction) perpendicular to a direction (the A direction) in which the pair of beam portions 40a extends in directions along the surface of the mirror portion 4a. In addition, the torsion portion 40c has a columnar shape. In addition, a pair of torsion portions 40c is arranged. One of the pair of torsion portions 40c is connected to one of the pair of beam portions 40a, and the other torsion portion 40c is connected to the other beam portion 40a. In addition, each of the pair of torsion portions 40c is connected to the mirror portion disposition portion 40d.

The mirror portion disposition portion 40d is configured so that the mirror portion 4a is disposed thereon. In addition, the mirror portion disposition portion 40d is connected to the pair of beam portions 40a via the torsion portions 40c.

The drive source 4b is configured to generate a plate wave which swings the mirror portion 4a. The plate wave refers to a vibration in an XY plane direction generated by expansion and contraction of the drive source 4b in the C direction. The drive source 4b is configured to swing the mirror portion 4a in a way of reciprocally vibrating the mirror portion 4a around an axis line of the predetermined swing axis Ax by the generated plate wave. That is, the optical scanner 4 is an optical scanner of resonance driving type.

As shown in FIG. 3, the holding member 41 is configured to hold the support portion 40b. The holding member 41 holds the holding portion 40f. In addition, the holding member 41 is configured to hold each of the pair of beam portions 40a. The holding member 41 is configured to hold, in the pair of beam portions 40a, the holding portions 40e.

As shown in FIG. 3, the substrate 40 is in a shape having a space in which the mirror portion 4a reciprocally vibrates around the axis line of the swing axis Ax. In addition, although not shown in FIG. 3, the holding member 41 also has a shape the same as that of the substrate 40.

(Disposition of Convex Lens)

The disposition of the convex lenses 2 is described in detail based on FIG. 4. In the first embodiment, the plurality of convex lenses 2 are disposed side by side in the predetermined direction at intervals so that the light which is transmitted through and focused by the plurality of convex lenses 2 in a stationary state comes close. In the first embodiment, irradiation ranges of the focused lights adjacent to each other shown by hatching intersect at a point.

Figure 5:
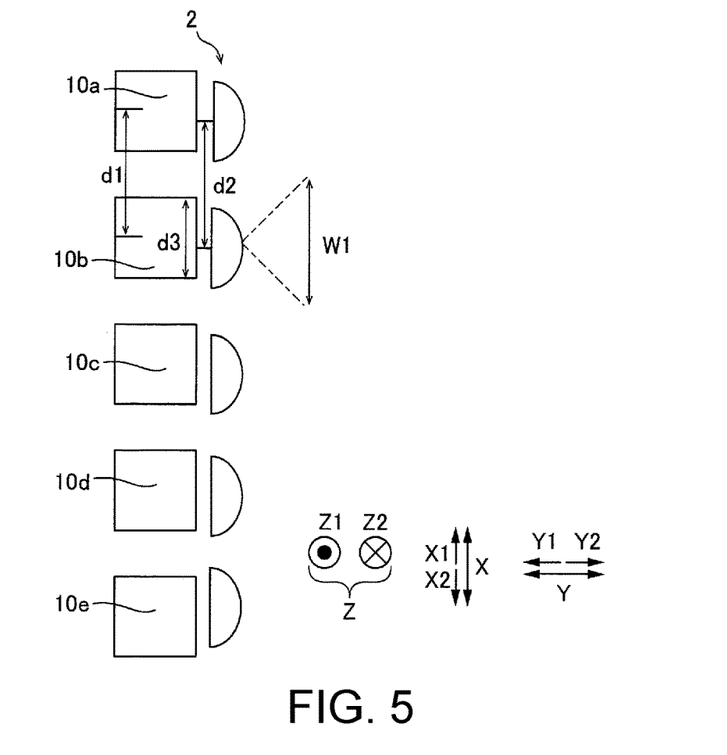
FIG. 5 is a diagram for describing the disposition of the light emission portions and the convex lenses.

As shown in FIG. 5, the plurality of convex lenses 2 are disposed in the same number as the plurality of light emission portions 10. The plurality of convex lenses 2 adjacent to each other are disposed side by side in the predetermined direction at intervals d2 which are equal to intervals d1 at which the plurality of light emission portions 10 are disposed side by side in the predetermined direction (the X direction), or smaller than the intervals d1 at which the plurality of light emission portions 10 are disposed side by side in the predetermined direction (the X direction). The interval d1 refers to a distance between central points of the light emission portions 10 adjacent to each other, and the interval d2 refers to a distance between central points of the convex lenses 2 adjacent to each other. For example, when the interval d1 between the light emission portions 10 is 4.0 mm, the interval d2 between the convex lenses 2 is set to be equal to or greater than 3.5 mm, and equal to or smaller than 4.0 mm.

With regard to the positional relationship among the light source 1, the plurality of convex lenses 2, the projection lens 3, and the mirror portion 4a, for example, the convex lenses 2 may be disposed in a position in which the light irradiated from the light source 1 is condensed, or the light irradiated from the light source 1 may be condensed after being transmitted through the convex lenses 2. Furthermore, the projection lens 3 is disposed in a position in which the light is condensed after being transmitted through the convex lenses 2. In addition, the projection lens 3 is disposed in a position in which virtual images of the convex lenses 2 are projected. In addition, the mirror portion 4a is disposed in a position in which the light inflected by the projection lens 3 is condensed. Besides, when the position of the mirror portion 4a is fixed, the position of the projection lens 3 (a distance between the mirror portion 4a and the projection lens 3) may be adjusted so that substantially all the light emitted from the mirror portion 4a is incident. However, in a case that the area of a mirror surface part of the mirror portion 4a is small, when substantially all the light emitted from the mirror portion 4a is incident to the projection lens 3 without regard to the distance between the mirror portion 4a and the projection lens 3, the position of the projection lens 3 is not required to be adjusted.

According to the intervals d2 at which the convex lenses 2 are disposed, the sizes in the X direction of the convex lenses 2, or the like, the convex lenses 2 are disposed offset in a direction (X direction) in which the plurality of convex lenses 2 are arranged from a position facing the plurality of light emission portions 10. At this time, the adjustment is performed so that the light can be incident from the light source 1, and the light is incident to the projection lens 3 in a state that virtual images V come close.

The plurality of convex lenses 2 are disposed so that the size of the focusing width of the light in the direction (the X direction) in which the plurality of light emission portions 10 are disposed side by side is equal to or smaller than the size of the intervals d1 between the plurality of light emission portions 10 adjacent to each other in a position in which the light is incident to the projection lens 3. The size of the focusing width of the light is a value obtained by subtracting, from a width W1 of the light irradiated to the projection lens 3, a length d3 of one side on an irradiation surface side of the light emission portion 10. For example, when the length d3 of one side of the light emission portion 10 is 1 mm and the interval d1 of the light emission portions 10 is 4 mm, the light of the light emission portions 10 incident to the convex lenses 2 is set to spread and be focused in the X1 direction and the X2 direction by 2 mm each. At this time, a length d4 in the X direction of the virtual image V is set to 4 mm.

Figure 6:
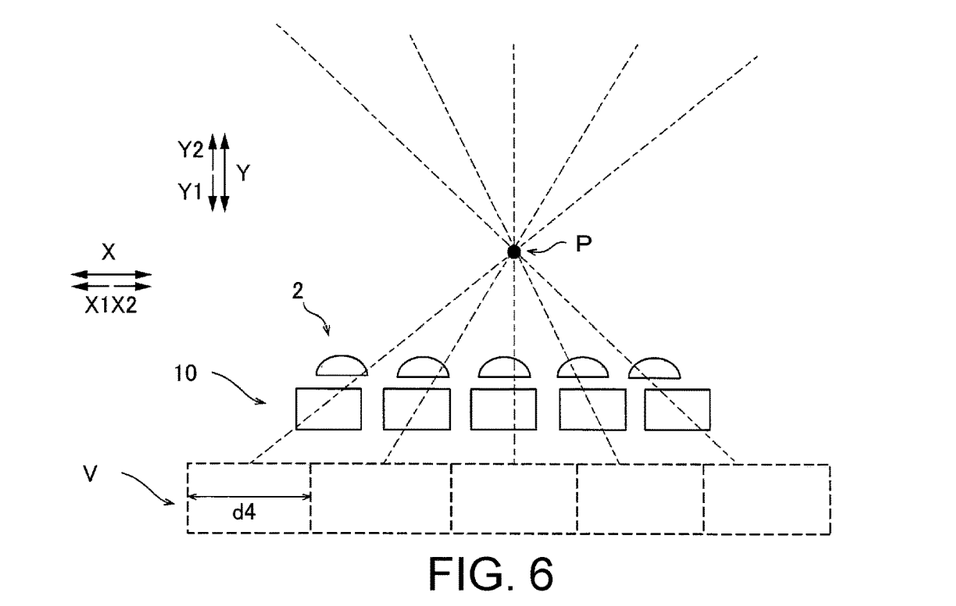
FIG. 6 is a diagram showing an example of the disposition of the convex lenses.

As shown in FIG. 6, as a method of adjusting the position of the plurality of convex lenses 2, the distance is adjusted so that the virtual images V of the plurality of convex lenses 2, which pass through a principal point P of the projection lens 3 and are formed on an opposite side with the light emission portions 10 therebetween, come close and are disposed side by side. At this time, the projection lens 3 is disposed so that a distance from the principal point P to the virtual images V in the Y direction and a distance from the principal point P to the projection lens 3 become the same distance.

Figure 7:
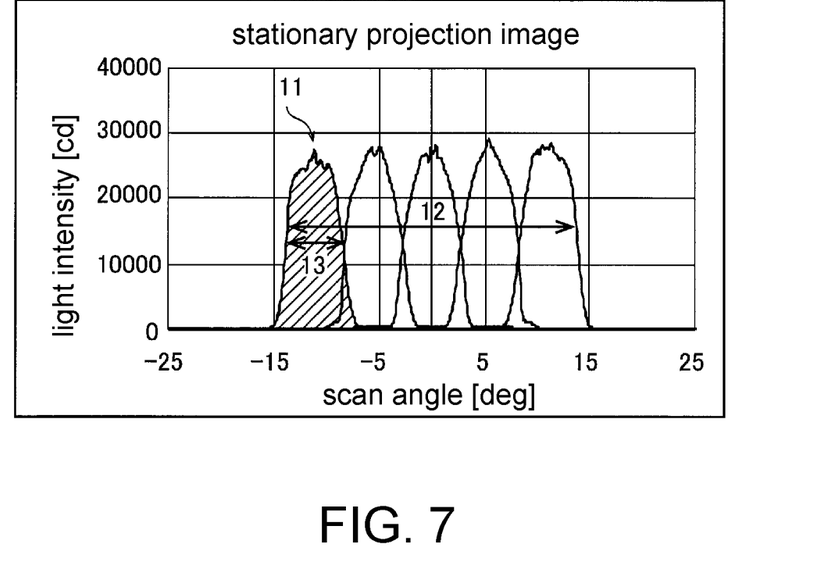
FIG. 7 is a diagram for describing the relationship between a full angle at half maximum of the light emission portions and a full angle at half maximum of the mirror portion.

The convex lenses 2 are disposed so that a full angle at half maximum 12 is equal to or greater than the value of the product of a full angle at half maximum 13 of each of the plurality of light emission portions 10 and the number of the plurality of light emission portions 10, wherein the full angle at half maximum 12 is a range of an angle having a value which is a half of a peak value of light intensity of the light reflected from the mirror portion 4a in the stationary state. FIG. 7 is a diagram showing the relationship between light intensity of each of the light emission portions 10 and an angle of the mirror portion 4a when there are five light emission portions 10, and one of the light emission portions 10 is shown by hatching. As shown in FIG. 7, a range in which the plurality of light emission portions 10 are overlapped is preferably small, and thus the full angle at half maximum 12 is set to have a value the same as that of the product of the full angle at half maximum 13 of each of the plurality of light emission portions 10 and the number of the plurality of light emission portions 10.

(Structure of Optical Scanner)

Figure 8:
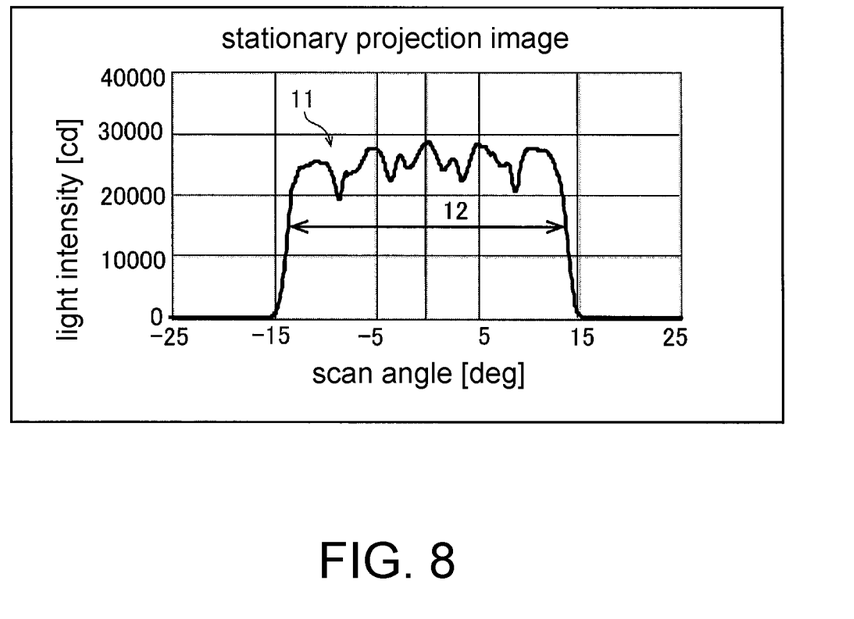
FIG. 8 is a diagram for describing a full angle at half maximum when the mirror portion is in a stationary state.

The control portion 7 of the optical scanner 4 controls the drive source 4b so as to set the scan angle θ during the scanning of the mirror portion 4a to be equal to or smaller than the full angle at half maximum, wherein the full angle at half maximum is the angle having the value which is a half of the peak value when the mirror portion 4a is in the stationary state. In FIG. 8, the scan angle θ is plotted on the horizontal axis, and light intensity is plotted on the longitudinal axis. FIG. 8 is a diagram showing a distribution 11 of light intensity of the scan angle θ, and the full angle at half maximum 12 is a range of an angle showing a value which is a half of a peak value of the distribution 11. For example, in a case that a half-value of a peak value of light intensity is shown when the scan angle θ in the stationary state of the mirror portion 4a is an angle of −15 degrees and an angle of 15 degrees, the full angle at half maximum 12 is 30 degrees which is the absolute value of the difference between 15 degrees and −15 degrees.

Figure 9:
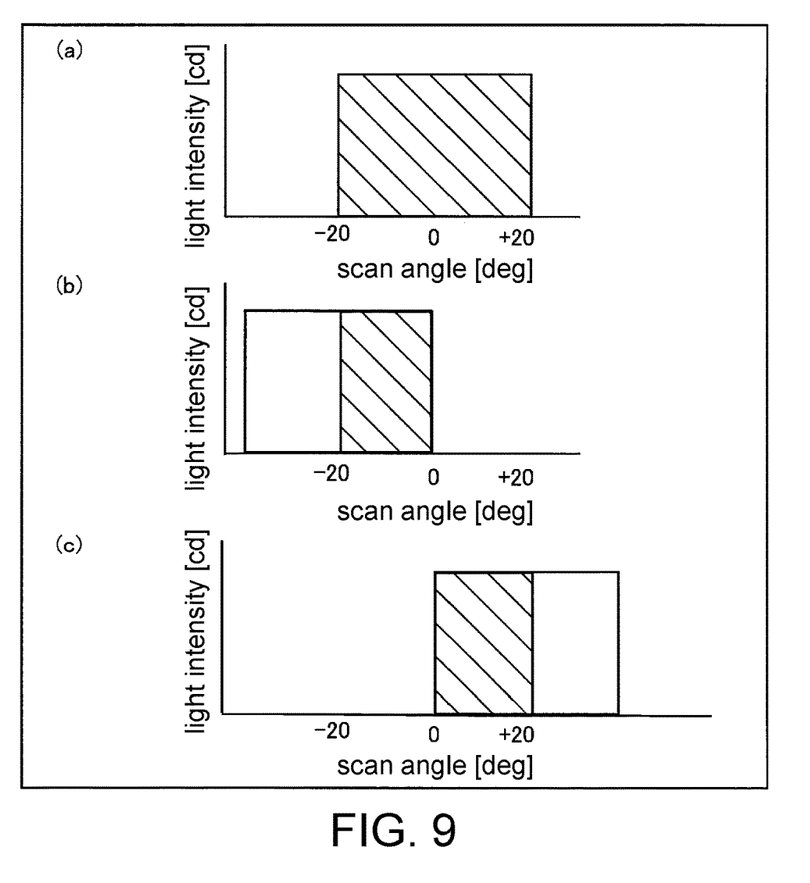
FIG. 9 is a field diagram for describing the relationship between an operation angle and light intensity when a scan angle is smaller than the full angle at half maximum in a stationary state.
Figure 10:
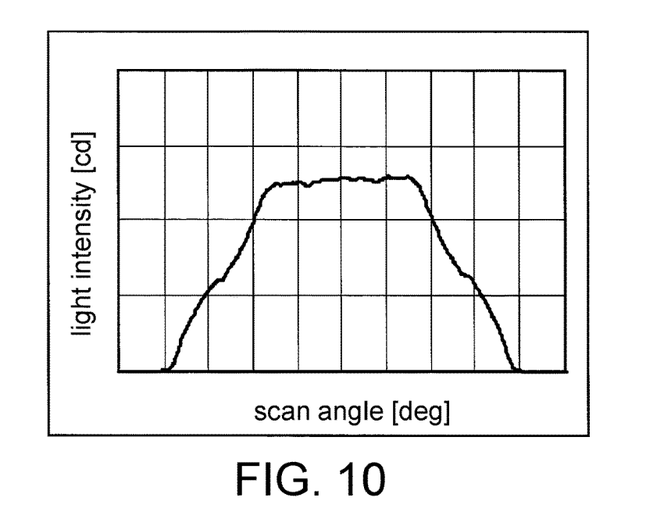
FIG. 10 is a diagram showing the relationship between the operation angle and light intensity when the scan angle is smaller than the full angle at half maximum in a stationary state.

FIG. 9a shows the relationship between the full angle at half maximum 12 in the stationary state and light intensity when the mirror portion 4a is swung at an angle equal to or smaller than the full angle at half maximum. When the scan angle θ is smaller than the full angle at half maximum 12, the state in FIG. 9a becomes the state shown in FIG. 9b if the movement to a negative direction by the scan angle θ is performed, and the state in FIG. 9a becomes the state shown in FIG. 9c if the movement to a positive direction by the scan angle θ is performed. Because irradiation time becomes shorter along with the movement from the hatching part which is a part overlapped with the part in the stationary state to the positive direction and the negative direction, the irradiation time becomes shorter toward an end in a white part which is not overlapped with the part in the stationary state, resulting in the reduction of light intensity. Then, a trapezoidal shape shown in FIG. 10 is formed.

Figure 11:
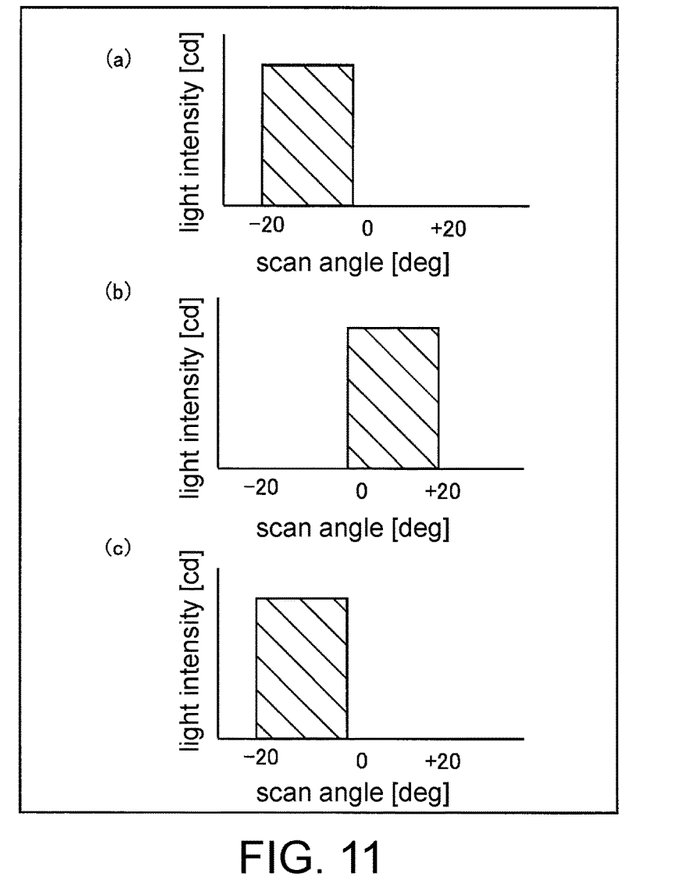
FIG. 11 is a field diagram for describing the relationship between the operation angle and light intensity when the full angle at half maximum in a stationary state and the scan angle are the same.
Figure 12:
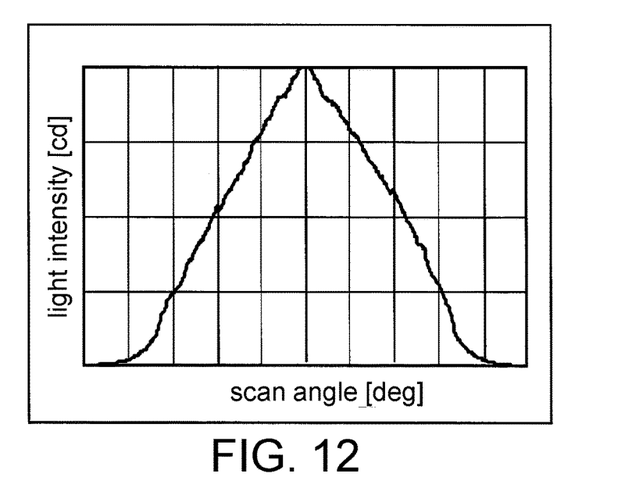
FIG. 12 is a diagram showing the relationship between the operation angle and light intensity when the full angle at half maximum in a stationary state and the scan angle are the same.

FIG. 11a shows the relationship between the full angle at half maximum 12 in the stationary state and light intensity when the mirror portion 4a is swung at an angle equal to or smaller than the full angle at half maximum. When the scan angle θ is equal to the full angle at half maximum 12, the state in FIG. 11a becomes the state shown in FIG. 11b if the movement to a negative direction by the scan angle θ is performed, and the state in FIG. 11a becomes the state shown in FIG. 11c if the movement to a positive direction by the scan angle θ is performed. Then, the part overlapped with the part in the stationary state becomes a line, the irradiation time becomes shorter toward an end, and thus light intensity is reduced. Then, a triangular shape shown in FIG. 12 is formed.

Figure 13:
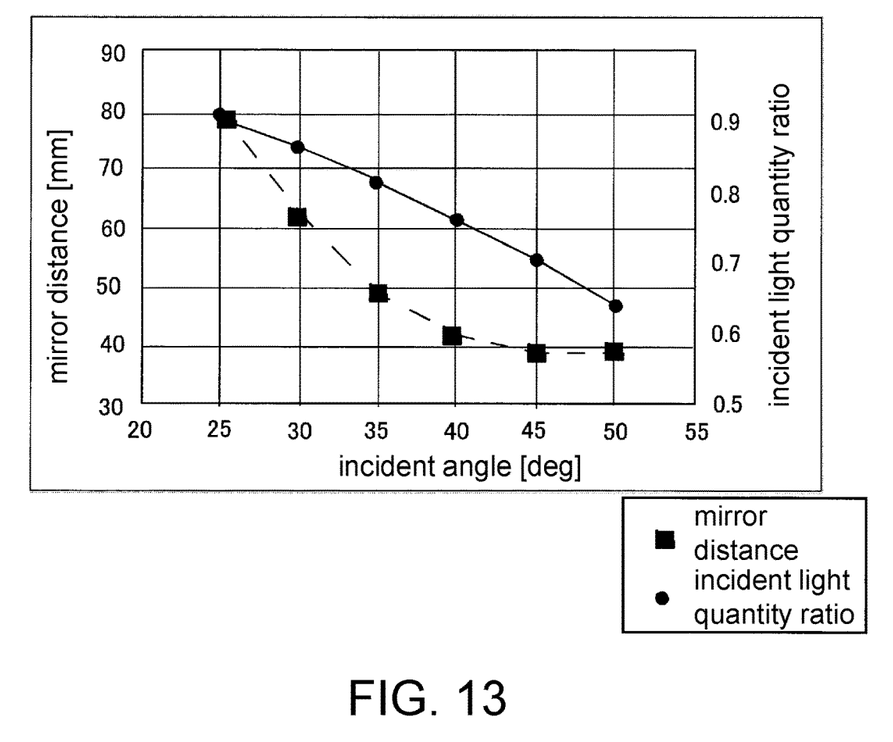
FIG. 13 is a diagram showing the relationship among a mirror distance, an angle, and an incident light quantity ratio.

FIG. 13 is a diagram obtained by overlapping a graph showing the relationship between a mirror distance and the scan angle θ and a graph showing the relationship between the scan angle θ and an incident light quantity ratio. If an incidence angle of the light from the light source 1 when the mirror portion 4a is in the stationary state is smaller than 35 degrees, the mirror distance becomes longer, and thus the configuration of the light projection device 100 becomes larger. In addition, when the scan angle θ exceeds 45 degrees, from the graph showing the relationship between the mirror distance and the scan angle θ, it is found that the mirror distance cannot be reduced. In addition, when the scan angle θ exceeds 45 degrees, from the graph showing the relationship between the scan angle θ and the incident light quantity ratio, it is found that the quantity of light becomes smaller. Therefore, the incidence angle of the light from the light emission portions 10 when the mirror portion 4a is in the stationary state is preferably equal to or greater than 35 degrees and equal to or smaller than 45 degrees. Besides, the mirror distance refers to a distance between the mirror portion 4a and the light emission portions 10.

(Formation of Irradiation Region and Light-Off Region)

The control portion 7 controls the region of the light irradiated from the plurality of light emission portions 10 and light distribution. The control portion 7 serves as a so-called adaptive driving beam (ADB) system and controls the region of the light irradiated from the plurality of light emission portions 10 and light distribution. Specifically, as shown in FIG. 2, the control portion 7 is configured to perform a control based on a detection result acquired by the detection portion 5 and the scan angle θ (see FIG. 4) of the mirror portion 4a acquired by the scan angle acquisition portion 6. In the control, by switching the light-on state and the light-off state of the light emission portions 10 emitting the light scanned in the region Rs in which the light is extinguished among the plurality of light emission portions 10, the region Rs in which the light is extinguished and the region Ri in which the light is irradiated are formed.

According to the detection result acquired by the detection portion 5, the control portion 7 sets a region in which it is detected that an oncoming vehicle is located in the region Ri in which the light is irradiated as the region Rs in which the light is extinguished. Based on the scan angle θ of the mirror portion 4a, the control portion 7 sets the light emission portions 10 emitting the light scanned in the region Rs in which the light is extinguished to the light-off state, and sets the light emission portions 10 except the above-described light emission portions 10 to the light-on state, thereby forming the region Ri in which the light is irradiated and the region Rs in which the light is extinguished.

Effects of First Embodiment

In the first embodiment, the following effects can be achieved.

In the first embodiment, as described above, the plurality of convex lenses 2 are disposed side by side in the predetermined direction at intervals so that the light which is transmitted through and focused by the plurality of convex lenses 2 in the stationary state comes close. Accordingly, the light transmitted through the convex lenses 2 in the stationary state comes close, and thereby even when there is a distance between the light emission portions 10, it can be suppressed that a part in which light intensity is locally small is formed, and thus the variation in light intensity can be suppressed. As a result, by suppressing the local light intensity variation in the stationary state, the generation of the local light intensity variation can be suppressed when the mirror portion 4a is scanned.

In addition, in the first embodiment, as described above, the plurality of convex lenses 2 adjacent to each other are disposed side by side in the predetermined direction at the intervals d2 which are equal to the intervals d1 at which the plurality of light emission portions 10 are disposed side by side in the predetermined direction, or smaller than the intervals d1 at which the plurality of light emission portions 10 are disposed side by side in the predetermined direction. Accordingly, the intervals at which the convex lenses 2 adjacent to each other are disposed is set to be equal to or smaller than the intervals between the light emission portions 10, thereby intervals of the focused light adjacent to each other can be reduced, and thus the focused light can be brought close to each other when the convex lenses 2 focus the light from the light emission portions 10. As a result, it can be suppressed that the part in which light intensity is small is formed because of the intervals between the light, and thus the variation in light intensity can be further suppressed.

In addition, in the first embodiment, as described above, the plurality of convex lenses 2 are disposed offset in the direction in which the plurality of convex lenses 2 are arranged from positions facing the plurality of light emission portions 10. Accordingly, the position in which the light is incident from the plurality of light emission portions 10 to the plurality of convex lenses 2 and the position in which the light is emitted from the plurality of convex lenses 2 can be adjusted, and thus an adjustment can be made so that the light transmitted through the convex lenses 2 comes close.

In addition, in the first embodiment, the plurality of convex lenses 2 are disposed so that the size of the focusing width of the light in the direction in which the plurality of light emission portions 10 are disposed side by side is equal to or smaller than the size of the intervals between the plurality of light emission portions 10 adjacent to each other in a position in which the light is incident to the mirror portion 4a or the projection lens 3. Accordingly, by setting the size of the focusing width of the light to be equal to or smaller than the size of the intervals d1 between the plurality of light emission portions 10 adjacent to each other, it can be suppressed that the region in which the focused light is overlapped becomes larger, and thus it can be suppressed that light intensity partly becomes higher.

In addition, in the first embodiment, as described above, the optical scanner 4 has the control portion 7 which controls the drive source 4b, and the control portion 7 of the optical scanner 4 is configured to control the drive source 4b to set the scan angle θ during the scanning of the mirror portion 4a to be equal to or smaller than the full angle at half maximum, wherein the full angle at half maximum is the angle having the value which is a half of the peak value of light intensity of the light reflected from the mirror portion 4a in the stationary state. Accordingly, because the scan angle θ is equal to or smaller than the full angle at half maximum, ranges of the light irradiated in the stationary state and during the scanning are partly overlapped in the vicinity of the center of the mirror portion 4a, and thus light intensity in the vicinity of the central point of the mirror portion 4a can be made higher than that in other positions.

In addition, in the first embodiment, as described above, the plurality of convex lenses 2 are configured so that the virtual images V of the plurality of convex lenses 2, which pass through the principal point P and are formed on an opposite side with the light source 1 therebetween, come close and are disposed side by side. Accordingly, the virtual images V come close, and thus by disposing the mirror portion 4a or the projection lens 3 at a distance the same as a distance between the principal point P and the virtual images V, the incident light to the mirror portion 4a or the projection lens 3 can be brought close to each other.

In addition, in the first embodiment, as described above, the incidence angle of the light from the light source 1 when the mirror portion 4a is in the stationary state is equal to or greater than 35 degrees and equal to or smaller than 45 degrees. The inventor of the application found that according to this configuration, the incidence angle is equal to or greater than 35 degrees, thereby the distance between the mirror portion 4a and the light source 1 can be reduced, and thus it can be suppressed that the light projection device 100 becomes larger. In addition, the inventor of the application found that by setting the incidence angle to be equal to or smaller than 45 degrees, it can be suppressed that the quantity of light incident to the mirror portion 4a becomes smaller.

In addition, in the first embodiment, as described above, the convex lenses 2 are set so that the full angle at half maximum 12 is equal to or greater than the value of the product of the full angle at half maximum 13 of each of the plurality of light emission portions 10 and the number of the plurality of light emission portions 10, wherein the full angle at half maximum 12 is an angle having the value which is a half of the peak value of light intensity of the light reflected from the mirror portion 4a in the stationary state. Accordingly, when a part of the light is to be extinguished, the light may be extinguished by the quantity corresponding to the full angle at half maximum of each of the plurality of light emission portions 10, and thus it can be suppressed that the irradiation range becomes narrower.

Second Embodiment

Figure 14:
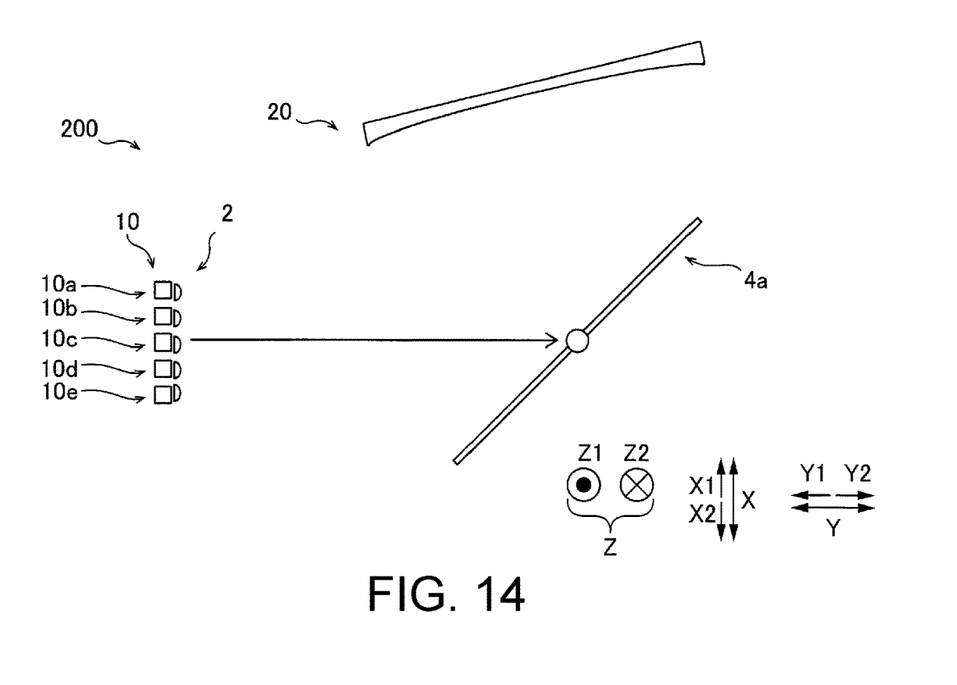
FIG. 14 is a diagram showing the positional relationship among light emission portions, convex lenses, a mirror portion, and projection lens according to a second embodiment.

Next, with reference to FIG. 14, the configuration of a light projection device 200 according to a second embodiment is described. In the second embodiment, different from the first embodiment, the projection lens 20 is a cylindrical lens disposed in a position to which the light scanned from the mirror portion 4a is projected. In the second embodiment, the projection lens 20 is disposed in a position in which the light reflected by the mirror portion 4a is irradiated.

The cylindrical lens has different magnifications in a horizontal direction and a vertical direction. Therefore, images can be formed in the horizontal direction to minimalize resolution of light shielding, and convergence can be performed in the vertical direction to improve light intensity. In addition, the cylindrical lens makes the light form images along a direction in which the irradiated light is scanned, and condenses the light toward a direction perpendicular to the direction in which the irradiated light is scanned.

Other configurations of the second embodiment are the same as the first embodiment described above.

Effects of Second Embodiment

In the second embodiment, the same as the first embodiment described above, the plurality of convex lenses 2 are disposed side by side in the predetermined direction at intervals so that the light which is transmitted through and focused by the plurality of convex lenses 2 in the stationary state comes close. Accordingly, the light transmitted through the convex lenses 2 in the stationary state comes close, and thereby even when there is a distance between the light emission portions 10, it can be suppressed that a part in which light intensity is locally small is formed, and thus the variation in light intensity can be suppressed. As a result, by suppressing the local light intensity variation in the stationary state, the generation of the local light intensity variation can be suppressed when the mirror portion 4a is scanned.

In addition, in the second embodiment, as described above, the projection lens 20 is configured to make the light form images along the direction in which the irradiated light is scanned, and condense the light toward the direction perpendicular to the direction in which the irradiated light advances. Accordingly, uniform irradiation can be performed by image formation of a part of the light, and light intensity can be increased by condensing a part of the light.

In addition, other effects of the second embodiment are the same as the first embodiment.

Variation Example

Besides, it should be considered that the embodiments disclosed here are illustrative in all respects and are not limitative. The scope of the disclosure is shown by the claims instead of the descriptions of the above embodiments and includes meanings equivalent to the claims and all modifications (variation examples) within the scope.

For example, in the first embodiment and the second embodiment described above, an example is shown in which the light projection device for vehicle of the disclosure has functions of an ADB, but the disclosure is not limited hereto. For example, the light projection device for vehicle of the disclosure may not have functions of an ADB.

For example, in the first embodiment and the second embodiment described above, an example is shown in which the plurality of convex lenses are disposed side by side in the predetermined direction at intervals which are equal to the intervals at which the plurality of light emission portions are disposed side by side in the predetermined direction, or smaller than the intervals at which the plurality of light emission portions are disposed side by side in the predetermined direction, but the disclosure is not limited hereto. For example, in order to adjust the irradiation position from the convex lenses to the mirror portion or the projection lens, the plurality of convex lenses may be disposed at intervals greater than the intervals at which the plurality of light emission portions is disposed side by side in the predetermined direction.

In addition, in the first embodiment and the second embodiment described above, an example is shown in which the plurality of convex lenses is disposed offset in the direction in which the plurality of convex lenses is arranged from positions facing the plurality of light emission portions, but the disclosure is not limited hereto. For example, the plurality of convex lenses may be disposed so as to face the positions facing the plurality of light emission portions.

In addition, in the first embodiment and the second embodiment described above, an example is shown in which the control portion is configured to control the drive source to set the scan angle during the scanning of the mirror portion to be equal to or smaller than the full angle at half maximum, wherein the full angle at half maximum is an angle having a value which is a half of the peak value of light intensity of the light reflected from the mirror portion in the stationary state, but the disclosure is not limited hereto. For example, the control portion may set the scan angle during the scanning of the mirror portion to be greater than the full angle at half maximum. In this case, the scan angle of the mirror portion may be set to be 1.3 times the full angle at half maximum.

Figure 15:
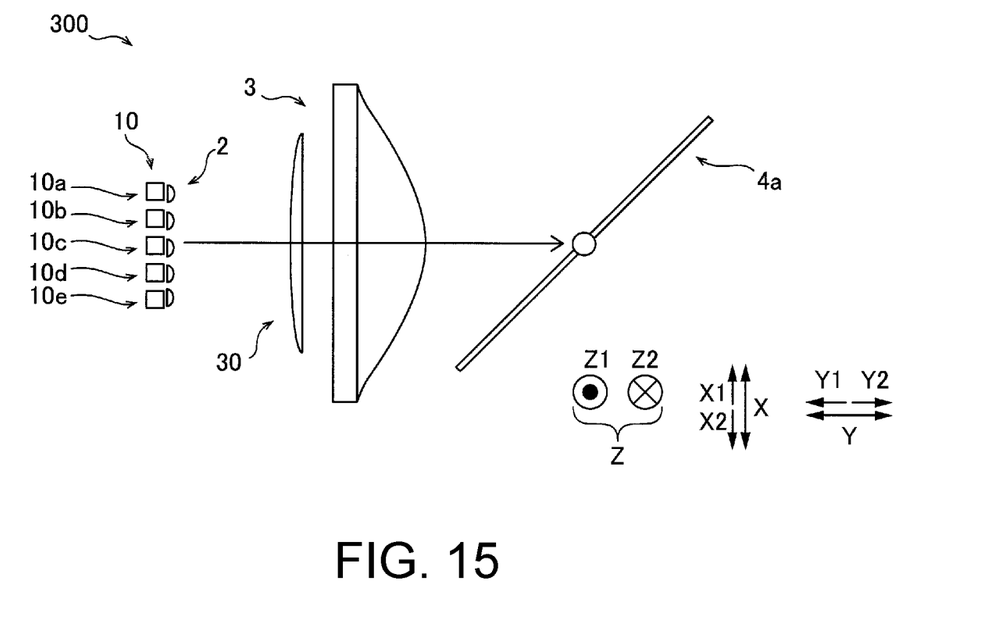
FIG. 15 is a diagram showing a variation example of the light projection device.

In addition, in the first embodiment described above, an example is shown in which the projection lens is arranged, but the disclosure is not limited hereto. For example, as shown in FIG. 15, a cylindrical lens 30 may be disposed in addition to the projection lens.

OTHER CONFIGURATIONS

A light projection device according to a first aspect of the disclosure includes: a light source which has a plurality of light emission portions disposed side by side in a predetermined direction; a plurality of convex lenses arranged in the same number as the plurality of light emission portions, which focus light when the light is irradiated from the plurality of light emission portions; an optical scanner which has a mirror portion that scans the light passing through the plurality of convex lenses in the direction in which the plurality of light emission portions are arranged, and a drive source that swings the mirror portion; and a projection lens which is disposed between the plurality of convex lenses and the mirror portion, or disposed so as to allow the light to be transmitted through after the light is scanned from the mirror portion. The plurality of convex lenses is disposed side by side in the predetermined direction at intervals so that the light which is transmitted through and focused by the plurality of convex lenses in a stationary state comes close. Here, "coming close" includes a case in which the light is close to each other but does not intersect, in addition to a case in which one end of the irradiation range of the focused light intersects.

In the light projection device according to the first aspect of the disclosure, as described above, the plurality of convex lenses is disposed side by side in the predetermined direction at intervals so that the light which is transmitted through and focused by the plurality of convex lenses in the stationary state comes close. Accordingly, the light transmitted through the convex lenses in the stationary state comes close, and thereby even when there is a distance between the light emission portions, it can be suppressed that a part in which light intensity is locally small is formed, and thus the variation in light intensity can be suppressed. As a result, by suppressing the local light intensity variation in the stationary state, the generation of the local light intensity variation can be suppressed when the mirror portion is scanned.

In the light projection device according to the first aspect described above, preferably, the plurality of convex lenses adjacent to each other are disposed side by side in the predetermined direction at intervals which are equal to intervals at which the plurality of light emission portions is disposed side by side in the predetermined direction, or smaller than intervals at which the plurality of light emission portions are disposed side by side in the predetermined direction. According to this configuration, by setting the intervals at which the convex lenses adjacent to each other are disposed to be equal to or smaller than the intervals between the light emission portions, intervals of the focused light adjacent to each other can be reduced, and thus the focused light can be brought close to each other when the convex lenses focus the light from the light emission portions. As a result, it can be suppressed that the part in which light intensity is small is formed because the light is at intervals, and thus the variation in light intensity can be further suppressed.

In this case, preferably, the plurality of convex lenses is disposed offset in the direction in which the plurality of convex lenses is arranged from positions facing the plurality of light emission portions. According to this configuration, a position in which the light is incident from the plurality of light emission portions to the plurality of convex lenses and a position in which the light is emitted from the plurality of convex lenses can be adjusted, and thus an adjustment can be made so that the light transmitted through the convex lenses comes close.

In the light projection device according to the first aspect described above, preferably, the plurality of convex lenses are disposed so that the size of the focusing width of the light in the direction in which the plurality of light emission portions are disposed side by side is equal to or smaller than the size of the intervals between the plurality of light emission portions adjacent to each other in a position in which the light is incident to the mirror portion or the projection lens. According to this configuration, by setting the size of the focusing width of the light to be equal to or smaller than the size of the intervals between the plurality of light emission portions adjacent to each other, it can be suppressed that a region in which the focused light is overlapped becomes larger, and thus it can be suppressed that light intensity partly becomes higher.

In the light projection device according to the first aspect described above, preferably, the optical scanner has a control portion which controls the drive source, and the control portion of the optical scanner is configured to control the drive source to set a scan angle during the scanning of the mirror portion to be equal to or smaller than a full angle at half maximum, wherein the full angle at half maximum is an angle having a value which is a half of a peak value of light intensity of the light reflected from the mirror portion in the stationary state. According to this configuration, because the scan angle is equal to or smaller than the full angle at half maximum, ranges of the light irradiated in the stationary state and during the scanning are partly overlapped in the vicinity of the center of the mirror portion, and thus light intensity in the vicinity of the central point of the mirror portion can be made higher than that in other positions.

In the light projection device according to the first aspect described above, preferably, the plurality of convex lenses is configured so that virtual images of the plurality of convex lenses, which pass through a principal point and are formed on an opposite side with the light source therebetween, come close and are disposed side by side. According to this configuration, the virtual images come close, and thus by disposing the mirror portion or the projection lens at a distance the same as a distance between the principal point and the virtual images, the incident light to the mirror portion or the projection lens can be brought close to each other.

In the light projection device according to the first aspect described above, preferably, an incidence angle of the light from the light source when the mirror portion is in the stationary state is equal to or greater than 35 degrees and equal to or smaller than 45 degrees. The inventor of the application found that according to this configuration, the incidence angle is equal to or greater than 35 degrees, and thereby a distance between the mirror portion and the light source can be reduced, and thus it can be suppressed that the light projection device becomes larger. In addition, the inventor of the application found that by setting the incidence angle to be equal to or smaller than 45 degrees, it can be suppressed that the quantity of light incident to the mirror portion becomes smaller.

In the light projection device according to the first aspect described above, preferably, the projection lens is configured to make the light form images along a direction in which the irradiated light is scanned, and condense the light toward a direction perpendicular to the direction in which the irradiated light is scanned. According to this configuration, uniform irradiation can be performed by making a part of the light form the images, and light intensity can be increased by condensing a part of the light.

A light projection device for vehicle according to a second aspect of the disclosure is mounted on a vehicle and irradiates light ahead of the vehicle, and includes: a light source which has a plurality of light emission portions disposed side by side in a predetermined direction; a plurality of convex lenses arranged in the same number as the plurality of light emission portions, which focus the light when the light is irradiated from the plurality of light emission portions; an optical scanner which has a mirror portion that scans the light passing through the plurality of convex lenses in the direction in which the plurality of light emission portions are arranged, and a drive source that swings the mirror portion; and a projection lens which is disposed between the plurality of convex lenses and the mirror portion, or disposed in a position to which the light scanned from the mirror portion is projected. The plurality of convex lenses is disposed side by side in the predetermined direction at intervals so that the light which is transmitted through and focused by the plurality of convex lenses in a stationary state comes close.

In the light projection device according to the second aspect of the disclosure, as described above, the plurality of convex lenses is disposed side by side in the predetermined direction at intervals so that the light which is transmitted through and focused by the plurality of convex lenses in a stationary state comes close. Accordingly, the light transmitted through the convex lenses in the stationary state comes close, and thereby even when there is a distance between the light sources, it can be suppressed that a part in which light intensity is locally small is formed, and thus the variation in light intensity can be suppressed. As a result, by suppressing the local light intensity variation in the stationary state, the generation of the local light intensity variation can be suppressed when the mirror is scanned and the light is irradiated ahead of vehicle.

In the light projection device according to the second aspect described above, preferably, a full angle at half maximum of the mirror portion is set to be equal to or greater than the value of the product of a full angle at half maximum of each of the plurality of light emission portions and the number of the plurality of light emission portions, wherein the full angle at half maximum of the mirror portion is an angle having a value which is a half of a peak value of light intensity of the light reflected from the mirror portion when the mirror portion is in the stationary state. According to this configuration, when a part of the light is to be extinguished, the light may be extinguished by the quantity corresponding to the full angle at half maximum of each of the plurality of light emission portions, and thus it can be suppressed that the irradiation range becomes narrower.

According to the disclosure, as described above, a light projection device and a light projection device for vehicle can be provided which can suppress the generation of the local light intensity variation when the mirror portion is scanned.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A light projection device, comprising:
   a light source which has a plurality of light emission portions disposed side by side in a predetermined direction;
   a plurality of convex lenses arranged in the same number as the plurality of light emission portions, which focus light when the light is irradiated from the plurality of light emission portions;
   an optical scanner which has a mirror portion that scans the light transmitted through the plurality of convex lenses in a direction in which the plurality of light emission portions is arranged, and a drive source that swings the mirror portion; and
   a projection lens which is disposed between the plurality of convex lenses and the mirror portion, or disposed in a position to which the light scanned from the mirror portion is projected,
   wherein the plurality of convex lenses is disposed side by side in a predetermined direction at intervals so that the light which is transmitted through and focused by the plurality of convex lenses in a stationary state comes close,
   the plurality of convex lenses is disposed so that a size of a focusing width of the light in the direction in which the plurality of light emission portions is disposed side by side is equal to or smaller than a size of the intervals between the plurality of light emission portions adjacent to each other in a position in which the light is incident to the mirror portion or the projection lens.

2. The light projection device according to claim 1, wherein the plurality of convex lenses adjacent to each other are disposed side by side in the predetermined direction at the intervals which are equal to intervals at which the plurality of light emission portions is disposed side by side in the predetermined direction, or smaller than the intervals at which the plurality of light emission portions are disposed side by side in the predetermined direction.

3. The light projection device according to claim 2, wherein the plurality of convex lenses is disposed offset in a direction in which the plurality of convex lenses is arranged from positions facing the plurality of light emission portions.

4. The light projection device according to claim 2, wherein the optical scanner comprises a control portion which controls the drive source, and
   the control portion of the optical scanner is configured to control the drive source to set a scan angle during scanning of the mirror portion to be equal to or smaller than a full angle at half maximum, wherein the full angle at half maximum is an angle having a value which is a half of a peak value of a light intensity of the light reflected from the mirror portion in the stationary state.

5. The light projection device according to claim 2, wherein the plurality of convex lenses is configured that virtual images of the plurality of convex lenses, which pass through a principal point and are formed on an opposite side with the light source therebetween, come close and are disposed side by side.

6. The light projection device according to claim 2, wherein an incidence angle of the light from the light source when the mirror portion is in the stationary state is equal to or greater than 35 degrees and equal to or smaller than 45 degrees.

7. The light projection device according to claim 2, wherein the projection lens is configured to make the light form images along a direction in which irradiated light is scanned, and condense the light toward a direction perpendicular to the direction in which the irradiated light is scanned.

8. The light projection device according to claim 1, wherein the optical scanner comprises a control portion which controls the drive source, and
   the control portion of the optical scanner is configured to control the drive source to set a scan angle during scanning of the mirror portion to be equal to or smaller than a full angle at half maximum, wherein the full angle at half maximum is an angle having a value which is a half of a peak value of a light intensity of the light reflected from the mirror portion in the stationary state.

9. The light projection device according to claim 1, wherein the plurality of convex lenses is configured that virtual images of the plurality of convex lenses, which pass through a principal point and are formed on an opposite side with the light source therebetween, come close and are disposed side by side.

10. The light projection device according to claim 1, wherein an incidence angle of the light from the light source when the mirror portion is in the stationary state is equal to or greater than 35 degrees and equal to or smaller than 45 degrees.

11. The light projection device according to claim 1, wherein the projection lens is configured to make the light form images along a direction in which irradiated light is scanned, and condense the light toward a direction perpendicular to the direction in which the irradiated light is scanned.

12. A light projection device for vehicle which is mounted on a vehicle and irradiates light ahead of the vehicle, comprising:
   a light source which has a plurality of light emission portions disposed side by side in a predetermined direction;
   a plurality of convex lenses arranged in the same number as the plurality of light emission portions, which focus the light when the light is irradiated from the plurality of light emission portions;
   an optical scanner which has a mirror portion that scans the light passing through the plurality of convex lenses in a direction in which the plurality of light emission portions is arranged, and a drive source that swings the mirror portion; and a projection lens which is disposed between the plurality of convex lenses and the mirror portion, or disposed in a position to which the light scanned from the mirror portion is projected, wherein the plurality of convex lenses is disposed side by side in a predetermined direction at intervals so that the light which is transmitted through and focused by the plurality of convex lenses in a stationary state comes close, the plurality of convex lenses is disposed so that a size of a focusing width of the light in the direction in which the plurality of light emission portions is disposed side by side is equal to or smaller than a size of the intervals between the plurality of light emission portions adjacent to each other in a position in which the light is incident to the mirror portion or the projection lens.

13. The light projection device for vehicle according to claim 12, wherein a full angle at half maximum of the mirror portion is set to be equal to or greater than a value of a product of a full angle at half maximum of each of the plurality of light emission portions and a number of the plurality of light emission portions, wherein the full angle at half maximum of the mirror portion is an angle having a value which is a half of a peak value of a light intensity of the light reflected from the mirror portion when the mirror portion is in the stationary state.

* * * * *